US006276494B1

(12) United States Patent
Ward et al.

(10) Patent No.: US 6,276,494 B1
(45) Date of Patent: Aug. 21, 2001

(54) BRAKE WEAR SENSOR

(75) Inventors: Andrew John Ward, Birmingham; Ian Douglas Poole, West Midlands; Martin Bissell, Birmingham; Denis John McCann, Powys, all of (GB)

(73) Assignee: ArvinMeritor, Inc., Troy, MI (US)

( * ) Notice: Subject to any disclaimer, the term of this patent is extended or adjusted under 35 U.S.C. 154(b) by 0 days.

(21) Appl. No.: 09/125,089

(22) PCT Filed: Feb. 6, 1997

(86) PCT No.: PCT/GB97/00329

§ 371 Date: Dec. 7, 1998

§ 102(e) Date: Dec. 7, 1998

(87) PCT Pub. No.: WO97/29298

PCT Pub. Date: Aug. 14, 1997

(30) Foreign Application Priority Data

Feb. 7, 1996 (GB) .................................................. 9602439
May 22, 1996 (GB) .................................................. 9610762
Jun. 3, 1996 (GB) .................................................. 9611532

(51) Int. Cl.[7] .................................................. F16D 66/00
(52) U.S. Cl. .............................. 188/1.11 W; 188/1.11 L; 188/71.9
(58) Field of Search ........................ 188/1.11 W, 1.11 R, 188/1.11 L, 1.11 E, 71.7, 71.8, 71.9, 196 D, 196 V

(56) References Cited

U.S. PATENT DOCUMENTS 5,520,267 * 5/1996 Giering et al. ....................... 188/72.9
5,848,672 * 12/1998 Brearley et al. .................. 188/1.11 L
5,848,673 * 12/1998 Strauss et al. .................... 188/1.11 L

FOREIGN PATENT DOCUMENTS 2 118 875     10/1972  (DE) .
0 460 378 A2  12/1991  (DE) .
0 567 155 A1  10/1993  (DE) .
WO 95/09991   4/1995   (WO) .

* cited by examiner

Primary Examiner—Robert J. Oberleitner
Assistant Examiner—Mariano Sy
(74) Attorney, Agent, or Firm—Christensen O'Connor Johnson Kindness PLLC

(57) ABSTRACT

A vehicle brake assembly of the kind comprises actuating means (6) for applying the brake linings (4, 5) to a brake rotor (1), adjusting means (13) adapted to be driven by the actuating means (6) for the purpose of maintaining the brake linings (4, 5) in close proximity to the brake rotor (1), and wear sensing means (60) responsive to actuation movement of the brake in a brake-applying direction. The wear sensing means (60) comprises a sensor (101) adapted to be operated by movement of an operating member (102) in a linear direction, a rotatable follower member (106) responsive to movement of the adjusting means (6), and a transmission mechanism (104) for translating rotary movement of the follower member (106) into linear movement of the operating member (102). The brake includes re-set means for resetting the relationship between a datum for the sensing means (60) and the brake during servicing of the brake. The re-set means may comprise means for adjusting the effective length of the operating member (107).

11 Claims, 10 Drawing Sheets

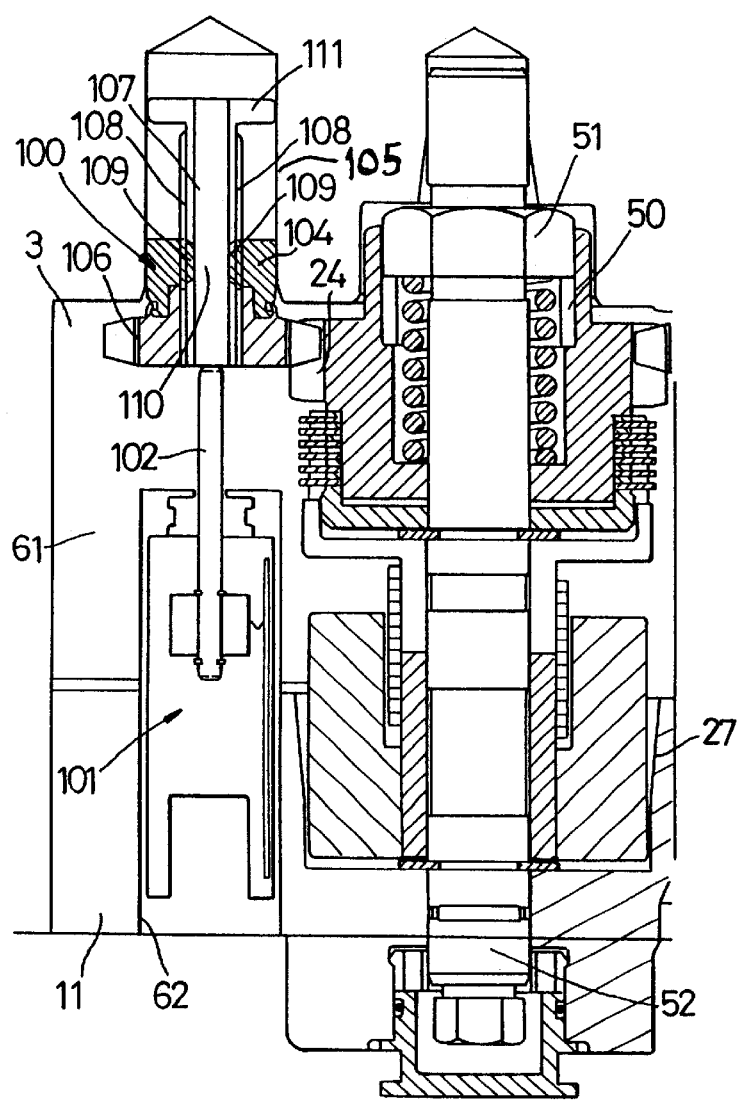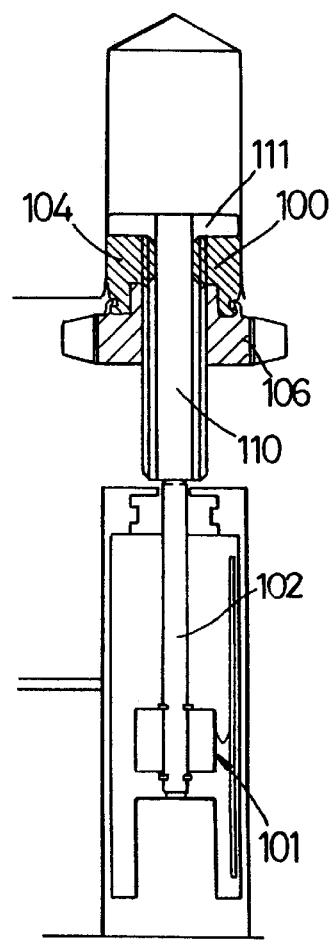
Fig. 2
Fig. 3

BRAKE WEAR SENSOR

This is a United States national application corresponding to copending international application PCT/GB97/00329, filed Feb. 6, 1997, which designates the United States, the benefit of the filing date of which is hereby claimed under 35 U.S.C. §120, which in turn claims the benefit of British Application No. 9602439.3, filed Feb. 7, 1996, No. 9610762.8, filed May 22, 1996,and No. 9611532.4, filed Jun. 3, 1996, the benefit of the filing dates of which are hereby claimed under 35 U.S.C. 119.

This invention relates to vehicle brake assemblies of the kind in which a friction lining has an operative applied to a rotatable braking member, such as a drum or a disc.

It is known to sense the wear of friction lining within a brake assembly through measurement of brake adjustment to compensate the wear.

In our International relation No. WO95/09991 we disclose the use of an "in adjuster" wear sensor comprising a rotary potentiometer driven by movement of adjuster means through a reduction gearbox. The sensor is integrally mounted with the adjuster means and is both assembled to, and removable from, the brake as part of a sub assembly incorporating the adjuster means.

According to one aspect our invention comprises a vehicle brake assembly comprising a friction brake lining having an operative face adapted to be applied to a rotatable braking member and actuating means for applying the braking lining to the rotatable braking member, adjusting means adapted to be driven by the actuating means for the purpose of maintaining the brake lining in close proximity to the rotatable braking member, and wear sensing means responsive to actuation movement of the brake in a brake-applying direction, the wear sensing means comprising a sensor adapted to be operated by movement of an operating member in a linear direction, a rotatable follower member responsive to movement of the adjusting means and a transmission mechanism for translating rotary movement of the follower member into linear movement of the operating member, and characterised in that the wear sensing means is adapted to be driven by the adjuster means, and the sensor is adapted to be driven from a gear wheel on the adjuster means with the end of the sensor remote from the gear wheel being formed with electrical connector means, whereby the unit can be removed from the brake for service without dismantling the brake assembly itself.

The incorporation of the transmission mechanism enables us to utilise a sensor operable by linear movement of the operating member. This facilitates manufacture, improves reliability, and ease of re-assembly where the need for resetting of the wear sensing means with respect to the brake position is eliminated Conveniently the sensor may comprise a linear displacement such as an inductive sensor or potentiometer.

The transmission mechanism is of adjustable length and of which components are in operative co-operation, to achieve the translation of rotary movement into linear movement.

In one construction a non-rotatable lead screw is movable in a longitudinal direction, in turn to move the operating member in a corresponding direction, and the follower member comprises a rotatable pinion which is captive against movement in a longitudinal direction, whereby rotation of the pinion in response to rotation of the gear wheel causes the lead screw to move in the longitudinal direction.

The relative sizes of the gear wheel and the pinion as well as the pitch on the lead screw can be chosen so as to produce a desired full scale input to the displacement sensor for a given range of new to fully worn brake linings.

The lead screw may carry an enlarged head to limit movement of the screw in the longitudinal direction. This prevents the screw from separating from the remainder of the transmission mechanism which otherwise might cause failure in respect of excessive pad wear or deflection of relatively movable parts of the brake assembly. This feature can also be employed to prevent the tappets within the brake housing from becoming disengaged when the brake is fully or over adjusted, as when the lead screw becomes locked the adjuster, and therefore the brake, are also prevented from being adjusted further.

Preferably components of the transmission mechanism are freely separable. This enables the wear sensor to be removed, without altering a datum position of which the sensor will automatically be re-set by re-assembly of the transmission mechanism.

For example, the lead screw may act on the sensor through an axially extending transmission member or rod with which it is in operative engagement.

Typically during servicing of the brake described above, the adjuster means and components of the actuating means, such as adjustable tappets, may be removed from a common brake housing. Upon re-assembly and replacement it is substantially impossible, or at least extremely difficult, to guarantee the positioned relationship between tappets and an output gear of the adjuster means, and therefore the input to the sensor of the wear sensing means.

According to another aspect of our invention, a vehicle brake assembly of the kind set forth incorporates reset means for resetting the relationship between a datum for the sensor and the brake during servicing of the brake assembly.

The reset means are adapted to be manipulated in a service centre or workshop, by the use of suitable tooling.

Preferably the reset means comprises means for adjusting the effective length of the lead screw to determine a desired datum position for the sensor when assembly the brake assembly with new friction linings.

Some embodiments of our invention are illustrated in the accompanying drawings in which:

FIG. 2 is a view shows brake wear sensor on an enlarged scale;

FIG. 3 is a view similar to FIG. 2 but showing the brake wear sensor in an extreme locked position;

Figure 1:
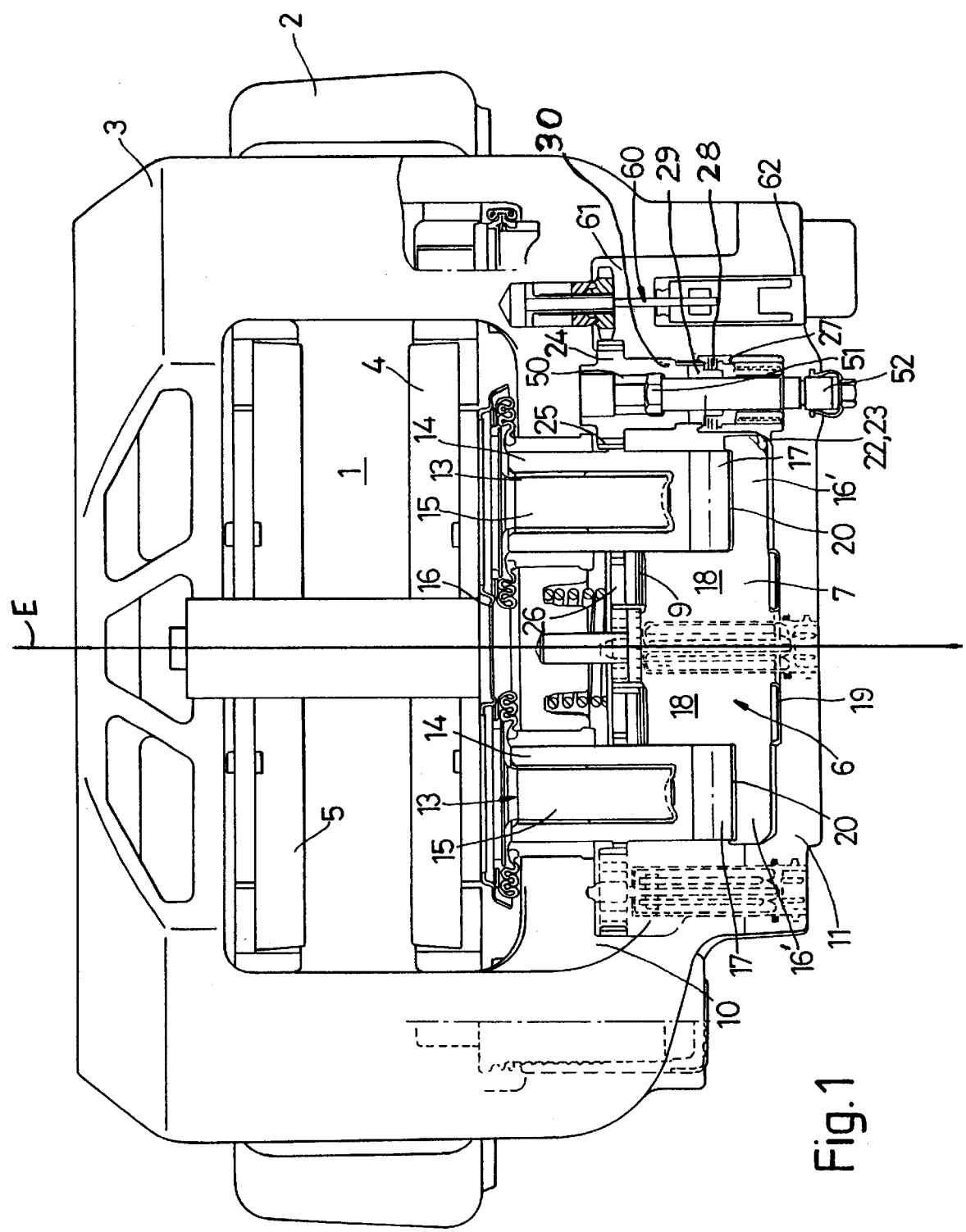
FIG. 1 illustrates a disc brake assembly in part section including a brake wear sensor.

In the disc brake illustrated in FIGS. 1 to 3 of the accompanying drawings the brake comprises a brake disc 1 and a brake carrier 2. A floating caliper 3 straddles the carrier member 2 and co-operates with two brake pad assemblies 4 and 5, each comprising a rigid backing plate guided to slide between circumferentially spaced drag take surfaces on the carrier, and a pad of friction material for engagement with an adjacent face of the disc 1. A brake actuating device 6 mounted in the caliper is adapted to urge the friction pad assembly 4 into engagement with the disc 1 and the reaction of disc pad assembly on the disc causes the caliper 3 to move bodily in the opposite direction with respect to the carrier 2, in turn to urge the friction pad assembly 5 into engagement with the opposite face of the disc 1.

The actuating device 6 comprises a rotary member 7 which is mounted in an opening in the caliper 2 between respective pairs of needle bearings 8 and 9 carried by a casing 10 and a cover 11 for the outer end of the casing. Two adjustable tappets 13 are housed in the casing 10 of the actuating device 6. Each of these tappets comprises a first internally threaded member 14, and a second externally threaded member 15. The tappets are disposed on opposite sides of a plane of symmetry E, parallel to and spaced from the same. The two second threaded members 15 are interconnected by a thin metal plate 16 so that they cannot be rotated, the metal plate at the same time serving as a heat shield between the members 15 and the friction pad assembly 4.

The rotary member 7 comprises two eccentrics 16' which are arranged in a terminal zone of the rotary member, acting through a roller body 17 onto a respective one of the first threaded members 14. The rotary member 7 is formed with a pair of journal pins 18 between the two eccentrics and the journal pins are supported in a depression 19 at the inner side of the cover 11 through an outer ring of the needle bearings 8. Both first threaded members 14 are connected to the rotary member 7 by a gear connection which comprises an angle drive and a coupling arrangement 20 also the angle drive is formed by meshing bevel teeth 22 and 23. A pinion 24 engages directly with external teeth 25 on the adjacent first threaded member 14 and only then does an intermediate gear 26 follow. The intermediate gear meshes with the external teeth of both first threaded members 14.

The pinion 24 is formed with an inner hexagon 50 which co-operates with a complementary hexagonal formation 51 on a return adjuster shaft 52.

A first sleeve 27 surrounds the shaft 52 and discs 28 between the coupling arrangement 20 and a second sleeve 29 provide a drive connection therebetween.

On actuation of the brake, rotation of the rotary member 7 is converted by the angle drive formed by the two bevel teeth 22 and 23 into rotation of the sleeve leaf 27 supported on the shaft 52 of the coupling arrangement 20. Once a rotational clearance has been overcome between the disc 28 and the second sleeve 29, a torque will act on the second sleeve 29, through a wrap spring 30, onto the pinion 24, and finally onto the first threaded member 14 through the intermediate gear 26 and the external teeth 25.

The first threaded member 14 will not rotate, however, if a brake relief clearance, has been overcome by the above mentioned rotational clearance so the two brake pad assemblies 4 and 5 have engaged the brake disc 1 which consequently transmits reactive force, in correspondence with the actuating force, to the two eccentrics 16' through a tappet formed by the two threaded members 14 and 15. The friction occurring in the readjustment thread pair 13, 14 on that occasion is greater than the torque which the coupling 20 can transmit.

If the rotational clearance between the discs 28 and the second sleeve 29 is overcome upon actuation of the brake, and the brake pad assemblies 4, 5 do not reach the brake disc to give rise to a corresponding reactive force, rotation of the first sleeve 27 will be transmitted through the stack of discs 28 to the second sleeve 29 and on through the wrap spring 30 to the pinion 24 and finally to the first threaded member 14 which consequently will be turned in the sense that the tappet is presents together with second threaded member 15 extends in length.

On release of the brake, the rotational movement of the rotary member 7, which is now in the opposite sense, is transmitted to the first leaf 27 but not further onto the pinion 24 because, in this direction of rotation, the wrap spring 30 opens and thus prevents the pinion 24 from accompanying the rotational movement.

Wear sensing means 60 is housed in an opening 61 in the caliper 3 and is accessible through a complementary opening 62 in the cover 11.

As illustrated the wear sensing means 60 comprises a pinion assembly 100 which acts on a linear potentiometer or inductive transducer wear sensor 101 through an axially extending transmission member or rod 102. The rod 102 is coupled to the sensor 101 but is in freely separable co-operation with the pinion assembly 100.

The pinion assembly comprises a bush 104 which is fixedly secured axially against rotation in a bore 105 in the casing 10 at the inner end of the opening 61 in the cover 11, suitably by a pressing operation, a pinion 106 which is rotatably captive to the bush 104 and which meshes with the pinion 24, and an elongate adjuster member 107 in the form of a lead screw acting between the bush 104 and the pinion 106 and with which the rod 102 is freely separable co-operation.

The adjuster member 107 is externally screw threaded to engage with internal screw threads on the pinion 106, and is formed with axially extending diametrically opposed keyways 108 which slidably receive complementary projections 109 on opposite sides of an aperture 110 in the bush 104 and through which the member 107 extends. The member 107 is thus keyed against rotation but is free to move axially.

In operative, rotation of the pinion 24 imparts a corresponding rotary movement to the pinion 106. Since the adjuster member 107 is keyed against rotation but is free to move axially, the screw-threaded engagement between the pinion 106 and the member 107 causes the member 107 to move relatively towards the potentiometer 101, with that movement transmitted to it through the rod 102. Thus the axial position of the end of the member 107 determines the setting of the potentiometer 101 for a given wear condition of the pads, with the member 107 and the rod 102 co-operating with each other to define a transmission mechanism of adjustable length.

Withdrawal of the potentiometer 101 is accompanied by withdrawal of the rod 102, and the adjuster member 107 remains in its adjusted position.

After servicing or repair, the potentiometer 101 is replaced in the opening 61 with the rod 102 co-operating with the member 107. As the potentiometer 101 is pushed home the co-operation of the rod 102 with the member 107 automatically re-sets the potentiometer 101 to reflect the given wear condition of the pads or current set condition of the brake.

As illustrated the lead screw 107 carries an enlarged head 111 at the end remote from the potentiometer 101. The head 111 acts as a stop for co-operation with the bush 104 to limit bodily movement of the lead screw 107 towards the potentiometer 101, as shown in FIG. 3.

This prevents the screw from separating from the remainder of the wear sensing means 60, and acting to preventing further adjustment of the brake, which might cause failure in respect of excessive pad wear or deflection of relatively movable parts of the brake assembly. This feature can also be employed to prevent the tappets within the brake housing from becoming disengaged when the brake is fully or over adjusted, as when the lead screw becomes locked with the adjuster, and therefore the brake, are also prevented from being adjusted further.

Figure 4:
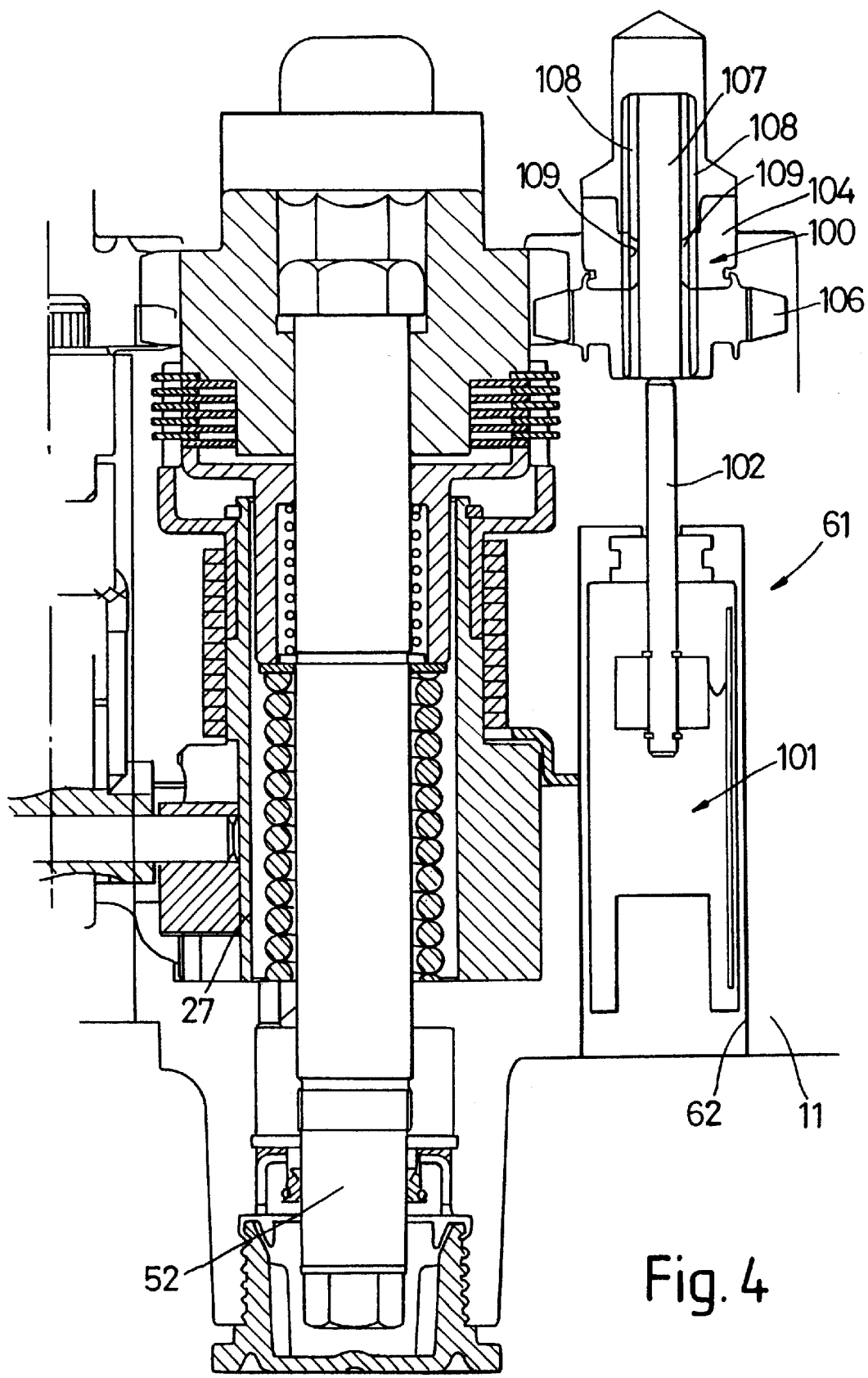
FIG. 4 is a view similar to FIG. 2 but showing a modification.

In the modified construction illustrated in FIG. 4 of the accompanying drawings the head 111 is omitted from the lead screw 107. This increases the adjuster stroke for a lead screw of a given length and can enable the brake to be adjusted to a position where the tappets can be removed for servicing.

Figure 5:
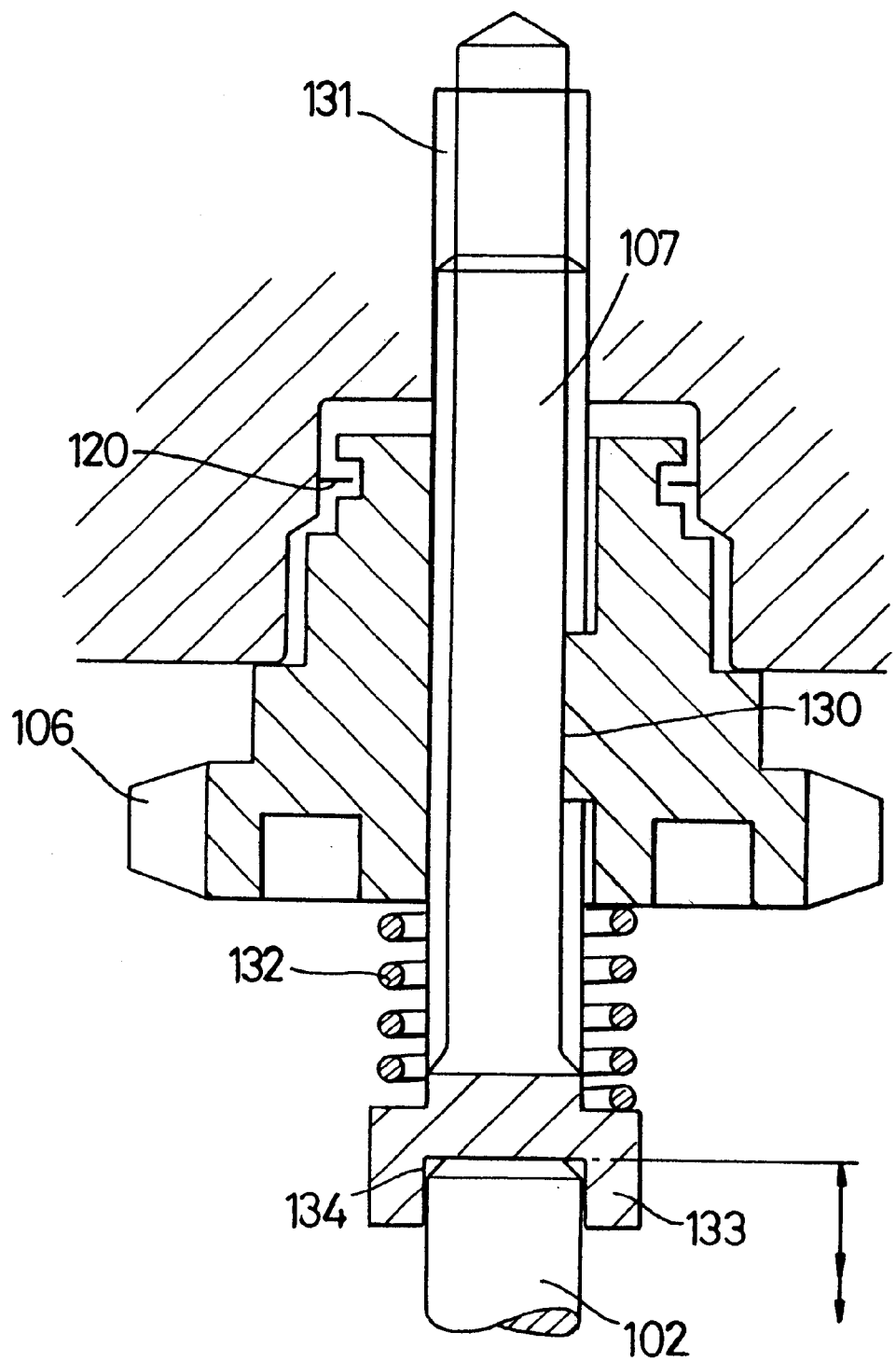
FIG. 5 illustrate yet another brake wear sensor.

In the modified construction illustrated in FIG. 5 of the accompanying drawings the bush 104 is omitted and the lead screw 107 has a slidable keyed engagement with a bore 130 in the centre of the pinion 106, which is of synthetic plastics material. The end of this lead screw 107 remote from the sensor is externally screw threadedly received in a tapped hole 131 in the brake caliper 3,. The lead screw 107 is spring urged away from the pinion 106 by means of a compression spring 132 acting between the pinion 107 and a head 133 on the lead screw 107 and with which the rod 102 co-operates. The rod 102 is received with a hexagonal recess 134 in the head, for stability.

In operation the tappets 13 are assembled, levelled and set to the height of the sensor assembly. The pinion 106 is assembled into the brake. The lead screw 107 is fitted and set to height relative to the tappet joint force upper level. The cover 11 and the first sleeve 27 are then fitted into position. The adjuster pinion 24 engages with the external teeth 25 on the adjacent threaded member 14 and the adjuster 52 is rotated if necessary. The pinion 106 engages with the pinion 24 and the pinion 106 is rotated, if necessary, to take up any lost motion.

Figure 6:
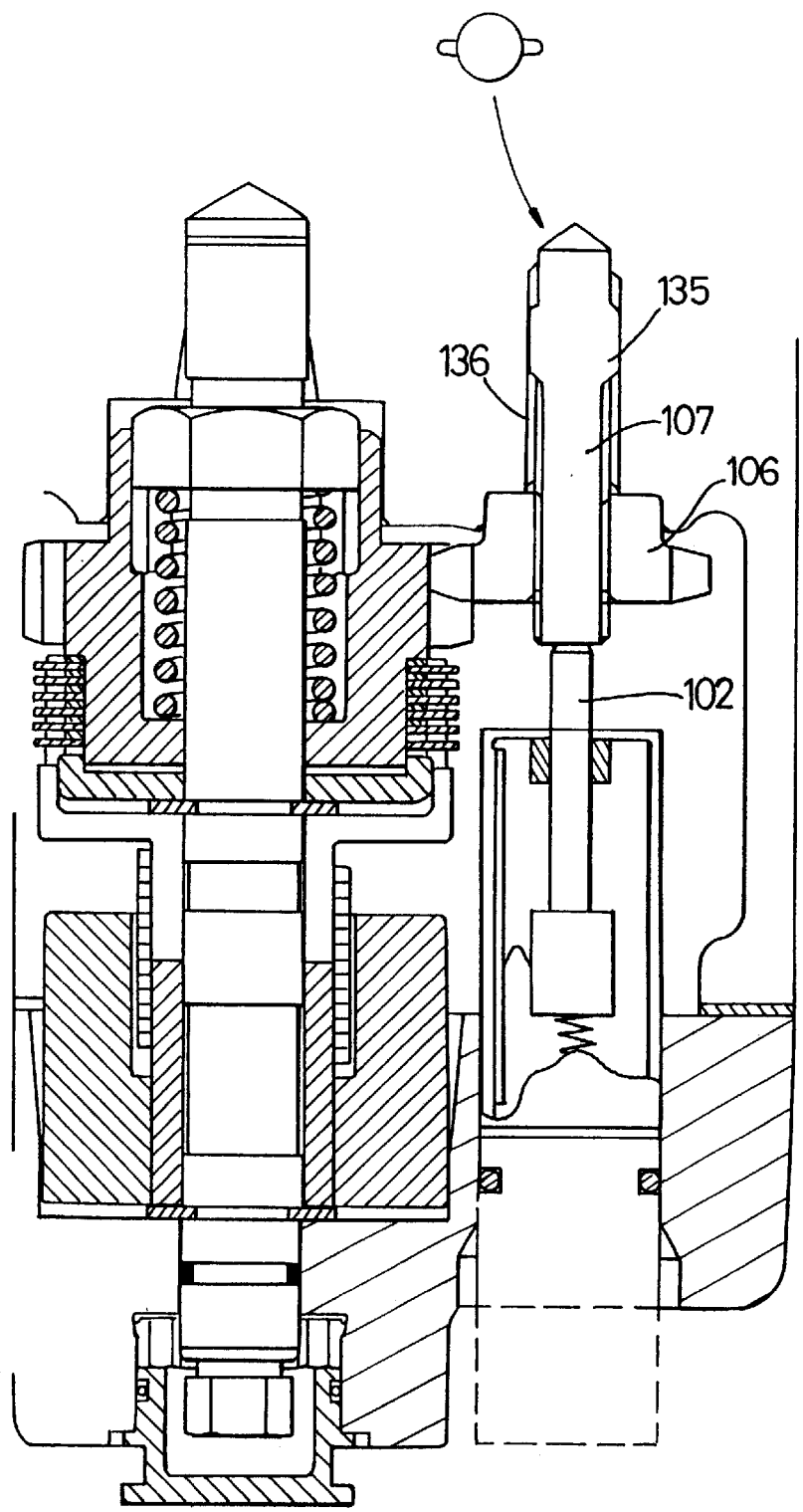
FIG. 6 illustrates a modified brake wear sensor.

In the construction illustrated in FIG. 6 of the accompanying drawings the bush is omitted and the lead screw 107 has a screw threaded engagement in the pinion 106 which is held against axial movement. The lead screw 107 is keyed against rotation with respect to the bore by means of diametrically opposed integral keys 135 guided to slide in complementary key-ways 136 in the wall of the bore.

Figure 7:
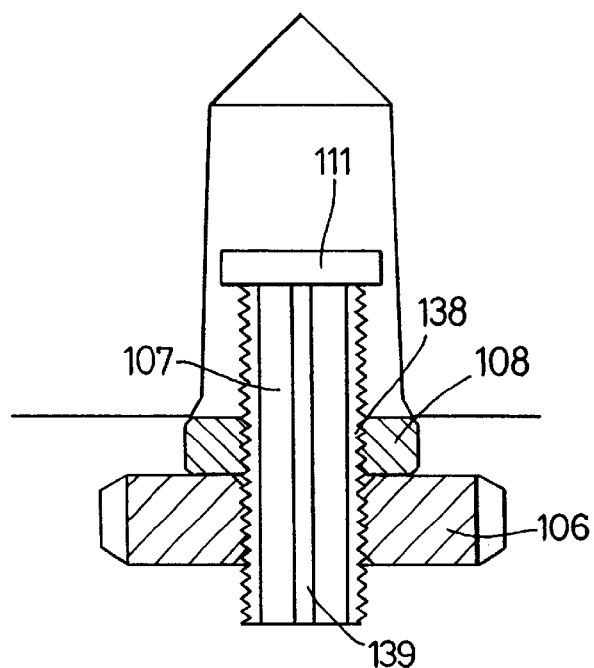
FIG. 7 shows another brake wear sensor.
Figure 8:
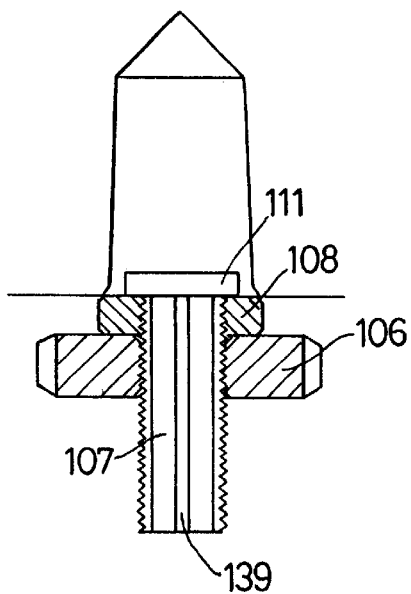
FIG. 8 shows the sensor of FIG. 7 prior to installation.
Figure 9:
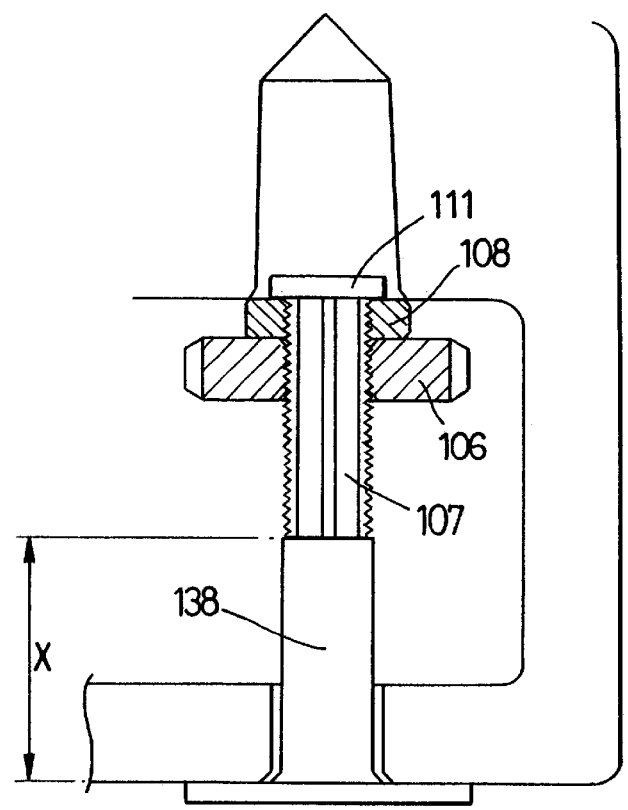
FIG. 9 shows the sensor installed in the brake assembly.

In the embodiment of FIG. 7, 8 and 9 the bush 108 has an opening through it provided with diametrically opposed lugs 138 which are slidably received in key-ways 139 in the lead screw 107.

In assembly, the lead screw 107 is wound up so that the head 111 clamps the bush 108 against the pinion 106. The bush 108 is then dropped into the bore as shown in FIG. 8.

The adjuster and other parts of the brake are then fitted and the tappets 13 are wound to a maximum opening position.

By the use of an assembly tool 138 acting on the lead screw 107 see FIG. 9, the bush 108 is pressed into the bore and the length of the tool 138 sets the dimension X for the wear sensor.

Figure 10:
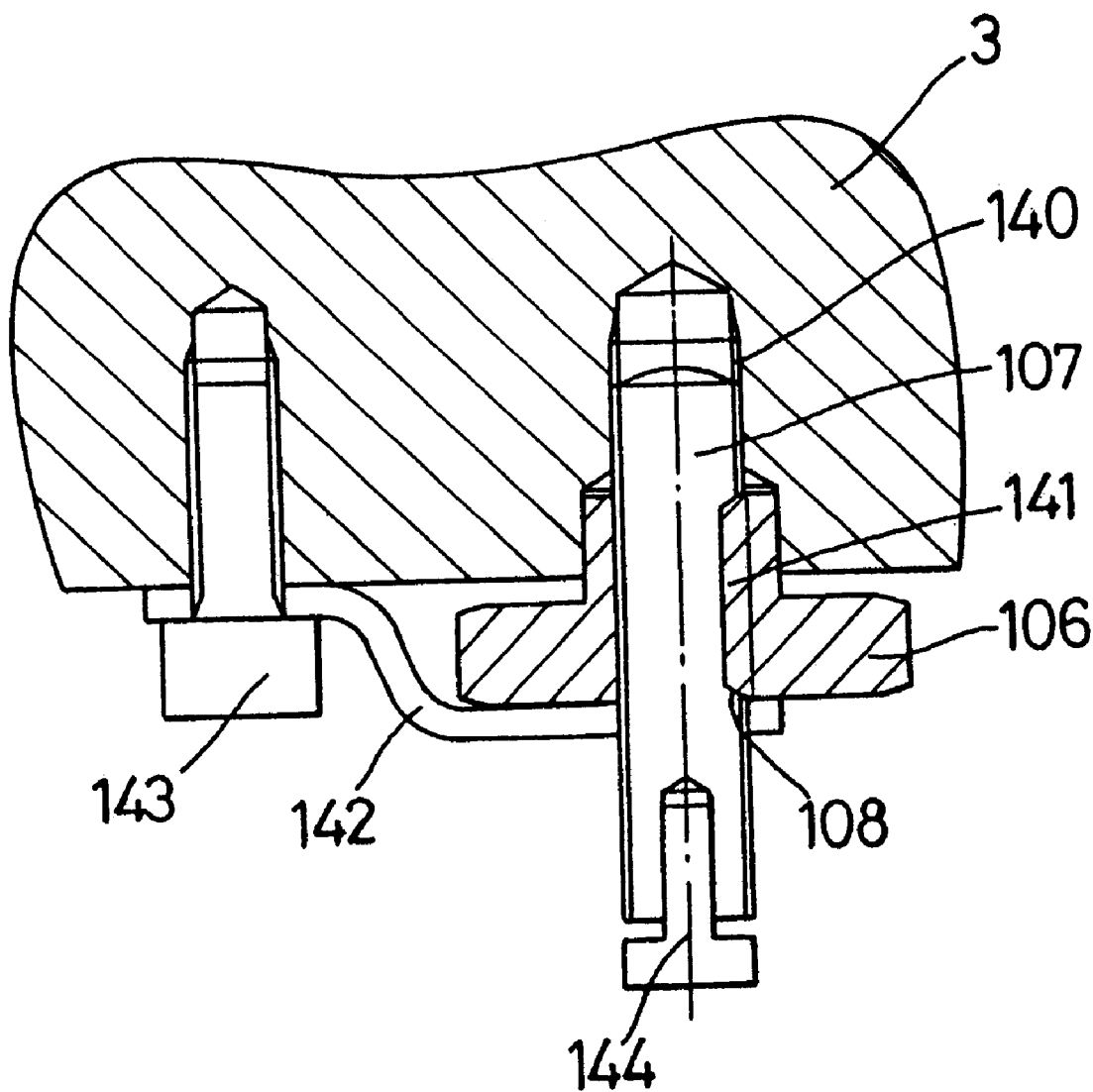
FIG. 10 shows yet another modified brake wear sensor.

In the construction illustrated in FIG. 10 of the accompanying drawings, the lead screw 107 is screwed into a tapped bore 140 in the caliper, and a key 141 moulded into the pinion 106 is slidably received in a key-way 108 in the lead screw 107. The pinion 106 is held against axially bodily movement by means of a metal strap or plate 142 which is secured to the caliper by a bolt 143.

A plug 144 is a press-fit in the free end of the lead screw 107 to set the adjustment position for the load sensing means.

Alternatively the plug 144 could be threaded and received in a tapped hole in the end of the lead screw 107. Such an arrangement enables the datum height between the drive mechanism and the sensor to be reset for the purposes of adjustment during servicing of the brake.

Figure 11:
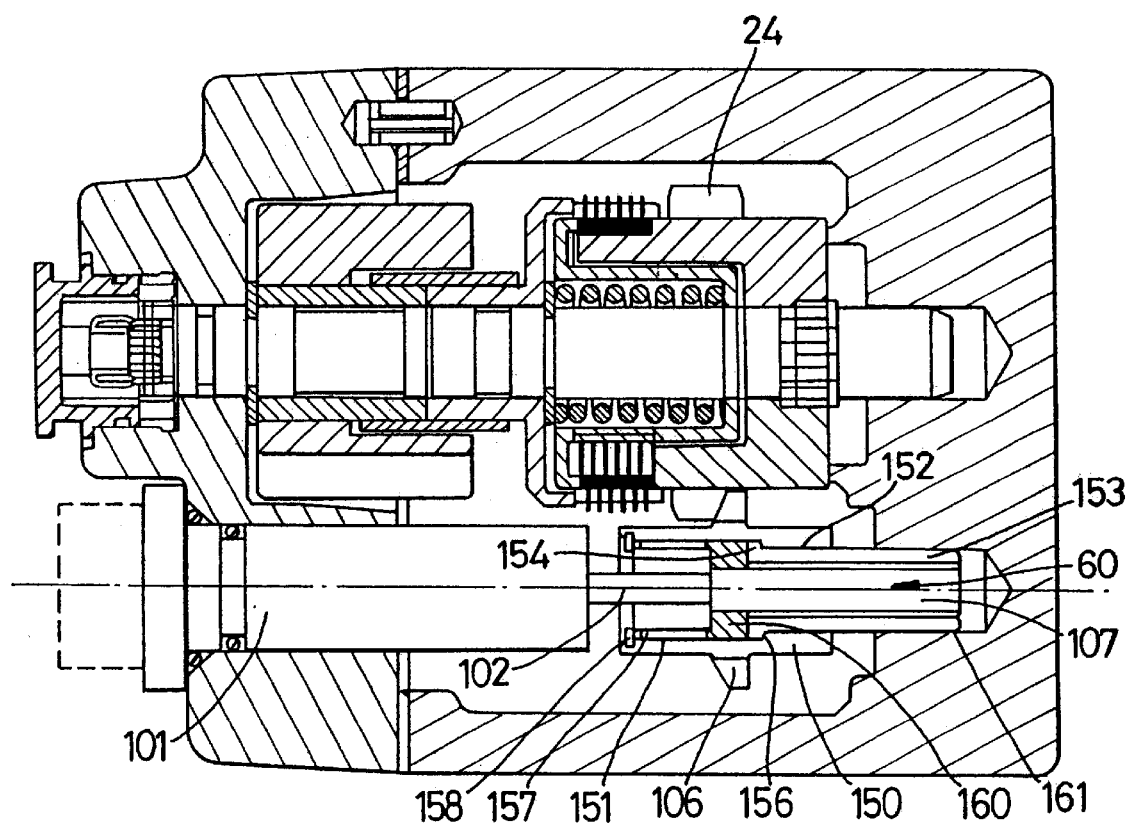
FIG. 11 is a longitudinal section through another wear sensor.
Figure 12:
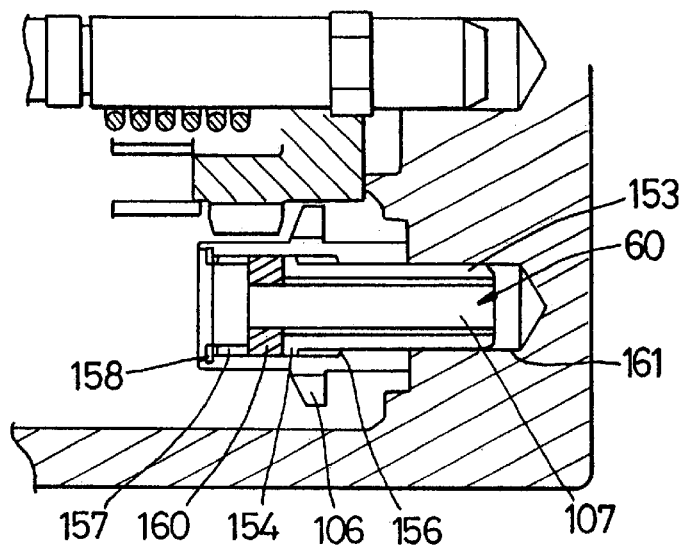
FIG. 12 shows the sensor FIG. 11 in a disengaged position.

In the construction illustrated in FIGS. 11 and 12 of the accompanying drawings, the pinion 106 is carried by an axially extending hub 150 which has a stepped bore including a bore portion 151 of larger diameter, and a bore portion 152 of smaller diameter. The pinion 106 and the hub 150 may comprise a one-piece plastics assembly. An elongate bush 153 guided to slide in the bore portion 152 has an enlarged head 154 slideably received in the larger bore portion 151. The head is normally held in abutment with a step 156 at the change in diameter between the two bore portions by means of a compression spring 157 which acts between an abutment 158 at the outer end of the hub 150, and a nut 160 guided for axial sliding movement in the bore portion 151 in which it is keyed against rotation. Conveniently the bore portion 151 and the nut 160 are of complementary hexagonal cross-section. The lead screw 107 for operating the potentiometer 101 through the rod 102 is screwed through the nut 160 and is held against rotation in the bush 153. For example a keyed or similar engagement may be provided between the lead screw 107 and the bush 153. 13

When assembling the sensor, the bush 153 is pressed into a bore 161 in the brake housing to an extent that when the spring 157 is fully extended and the pinion 106 is in engagement with the gear wheel 24, the hub 150 is spaced from the brake housing by a distance which permits the pinion 106 to be moved through the brake housing sufficiently far to allow disengagement of the pinion 106 from the gear wheel 24, as illustrated in FIG. 12 of the accompanying drawings.

To remove the sensor from the brake, the lead screw 107 is screwed out of the bush 153 through the nut 160. This then enables a puller to be inserted through the bush 153 for engagement with its inner end. The bush 153 can then be withdrawn from the housing by means of the puller.

Upon rebuilding the brake, the brake adjuster including the gear wheel 24, and the sensor are assembled into position as shown in the drawings with the bush 153 pressed into the bore 161 as described above. The adjuster is then rotated to drive the pinion 106 and hence the nut 160 can move the lead screw 107 to a desired datum position. With the lead screw 107 now set, by the use of a suitable plunger co-operating with the hub 150, the pinion 106 can be moved axially to disengage it from the gear wheel 24 as shown in FIG. 12. With the lead screw 107 now set, and the pinion 106 disengaged, the adjuster including the gear wheel 24 can again be rotated to move the brake tappets into a correct, given, position relating directly to the brake set position of the lead screw 107. When this position has been attained the plunger can be removed from the brake to enable the pinion 106 to move axially and automatically to mesh with the pinion 106 under the loading in the spring 157. The relationship between the sensor datum and a brake position has now been re-set and takes into account any changes made to the components of the brake to and the relative positions of the components of the brake during servicing.

Figure 13:
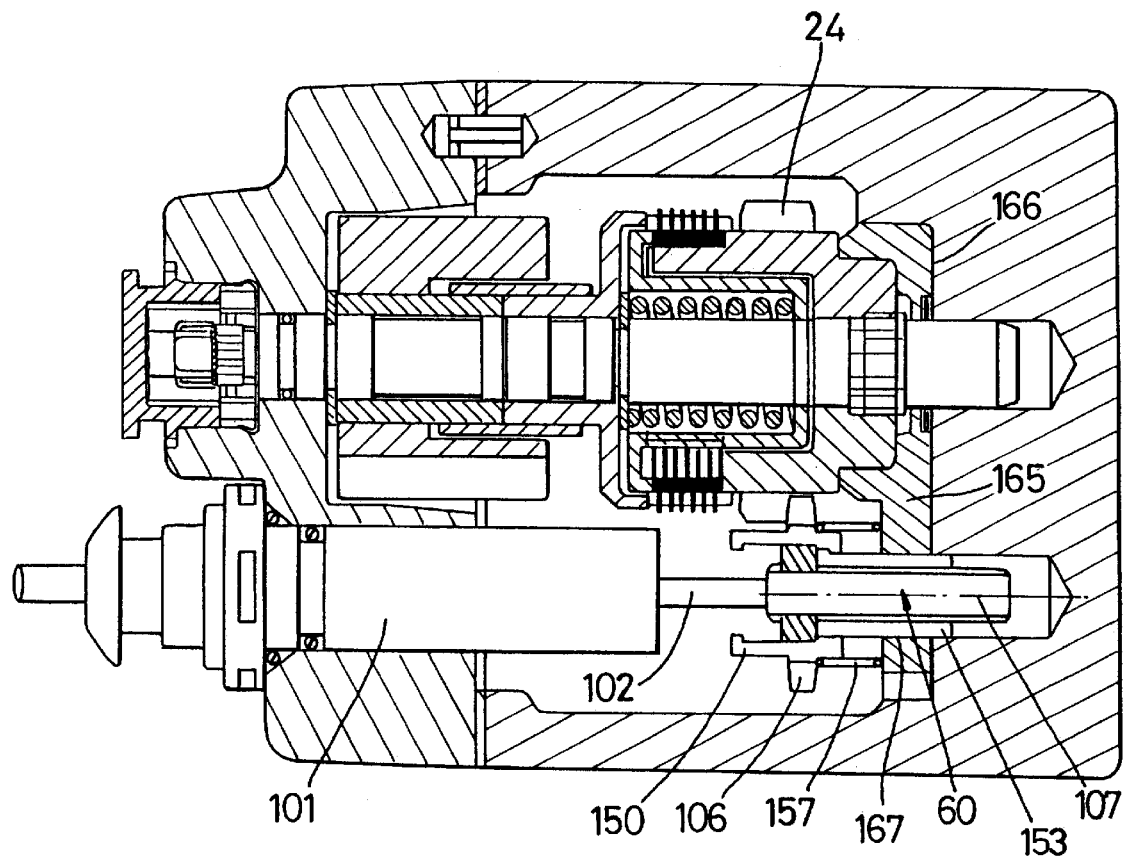
FIG. 13 is a view similar to FIG. 11 but showing a modification.
Figure 14:
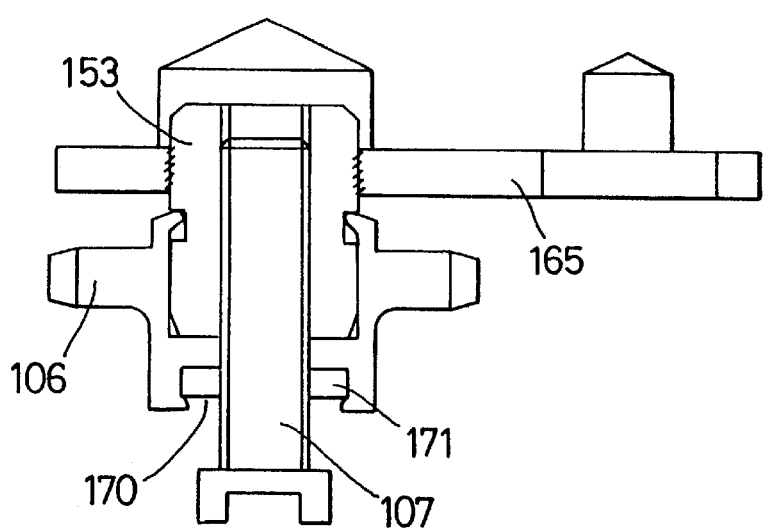
FIG. 14 is a view similar to FIG. 10, but showing a modification.

In the construction illustrated in FIG. 13 of the accompanying drawings both the adjuster mechanism including the gear wheel 24 and the wear sensing means 60 are supported by a common mounting plate 165 adapted to abut against a complementary face 166 in the brake housing. The bush 153 is now pressed into a complementary opening 167 in the plate 165 and not in an opening in the brake housing itself.

The provision of the mounting plate 165 enables the adjuster mechanism and the wear sensing means 60 to be removed from the brake together for servicing on a bench.

The construction and operation of the embodiment illustrated in FIG. 13 is otherwise the same as that of FIGS. 11 and 12 and corresponding reference numerals have been applied to correspond in parts.

In the construction described above with reference to FIGS. 11 to 13 the gear wheel 24 of the adjuster mechanism is in contact with either the brake housing or the mounting plate 165. This contact builds in friction against rotation of the gear wheel 24 which takes out the effects of any excess backlash in turn to ensure that the adjust, and therefore the sensor 60, only moved upon actual adjustment of the brake.

By providing the mounting plate 165 in the construction of FIG. 13 we are able to choose a suitable material for the mounting plate which can then be machined so as to optimise the friction interface characteristics between adjust gear wheel 24 and the brake. Thus precise durable control of backlash can be ensured which has the advantage of guaranteeing a long term quality signal from the sensing means 60 which will be free from effect of ripple generated by backlash.

Figure 15:
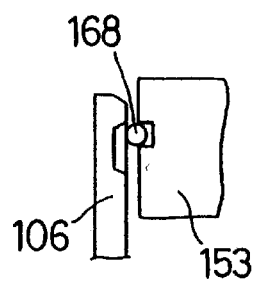
FIG. 15–18 show components of the sensor at FIG. 14.
Figure 17:
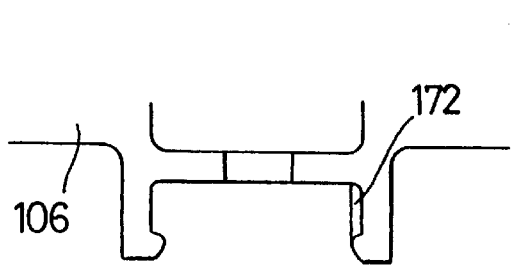
Figure 16:
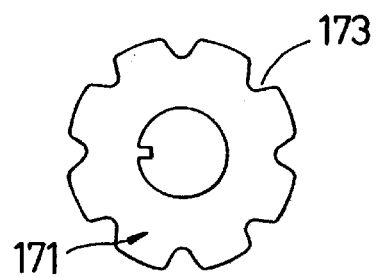
Figure 18:
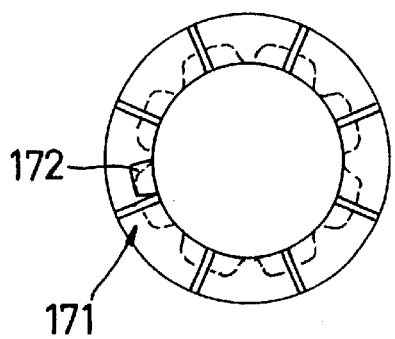

In the modified construction illustrated in FIGS. 14 to 18 of the accompanying drawings the bush 153 is again pressed into the opening 167 in the plate 165. In this construction, however, the pinion 106 encloses the outer end of the bush 153 to which it is keyed against relative movement in an axial direction by the provision of a snap ring 168 as illustrated in FIG. 15 of the accompanying drawings. The lead screw 107 is screw-threadably engaged in the bore in the bush 153 which is also screw threaded so that the lead screw 107 moves axially upon rotation of the pinion 106 which is transmitted to the lead screw through a drive mechanism 170. The drive mechanism comprises a drive disc 171 which is keyed to the lead screw 107, in turn to cause the lead screw 107 to move axially as it is rotated. The disc 171 has a suitable outline to co-operate with a ratchet mechanism, illustrated in FIGS. 17 and 18, and comprising circumferentially spaced dogs 172 having tapered profiles which engage with suitable slots 173 in the outer periphery of the drive disc 171.

The drive disc 171 is normally capable of being driven by rotation of the pinion 106 which, in turn, causes the lead screw 107 to be displaced in an axial direction as described above.

When re-adjustment is required the brake is put into the set condition in which the tappets are displaced to a known position. The pinion 106 can then be rotated with a suitable torque sufficient to overcome the detent force of the bi-directional ratchet. With the lead screw 107 set to the correct height and the relationship between the sensor datum and the brake now set, the sensor can then be refitted in the brake.

What is claimed is:

1. A vehicle brake assembly comprising a rotatable braking member, a friction brake lining having an operative face adapted to be applied to said rotatable braking member and actuating means for applying said brake lining to said rotatable braking member, adjuster means adapted to be driven by said actuating means for the purpose of maintaining said brake lining in close proximity to said rotatable braking member, and wear sensing means responsive to actuation movement of said brake assembly in a brake-applying direction, said wear sensing means comprising a sensor adapted to be operated by movement of an operating member in a linear direction, a rotatable follower member responsive to movement of said adjusting means, and a transmission mechanism for translating rotary movement of said follower member into linear movement of said operating member, and wherein said wear sensing means is adapted to be driven by said adjuster means, and said sensor is adapted to be driven from a gear wheel on said adjuster means with an end of said sensor remote from said gear wheel being formed with electrical connector means, whereby said wear sensing means can be removed from said brake assembly for service without dismantling said brake assembly itself.

2. A brake according to claim 1, wherein said sensor comprises a linear displacement means.

3. A brake according to claim 2, wherein said displacement means comprises an inductive sensor.

4. A brake according to claim 2, wherein said displacement means comprises a potentiometer.

5. A brake according to claim 1, wherein said transmission mechanism is of adjustable length and of which components are in operative co-operation to achieve said translation of rotary movement into linear movement.

6. A brake according to claim 5, wherein said components are in freely separate co-operation.

7. A brake according to claim 1, incorporating reset means for resetting a relationship between a datum for said sensor and said brake assembly during servicing of said brake assembly.

8. A vehicle brake assembly comprising a rotatable braking member, a friction brake lining having an operative face adapted to be applied to said rotatable braking member and actuating means for applying said brake lining to said rotatable braking member, adjuster means adapted to be driven by said actuating means for the purpose of maintaining said brake lining in close proximity to said rotatable braking member, and wear sensing means responsive to actuation movement of said brake assembly in a brake-applying direction, said wear sensing means comprising a sensor adapted to be operated by movement of an operating member in a linear direction, a rotatable follower member responsive to movement of said adjusting means, and a transmission mechanism for translating rotary movement of said follower member into linear movement of said operating member, wherein said wear sensing means is adapted to be driven by said adjuster means, and said sensor is adapted to be driven from a gear wheel on said adjuster means with an end of said sensor remote from said gear wheel being formed with electrical connector means, whereby said wear sensing means (unit) can be removed from said brake assembly for service without dismantling said brake assembly itself, and wherein a non-rotatable lead screw is movable in a longitudinal direction, in turn to move said operating member in a corresponding direction, and said follower member comprises a rotatable pinion which is captive against movement in a longitudinal direction, whereby rotation of said pinion in response to rotation of said gear wheel causes said lead screw to move in said longitudinal direction.

9. A brake according to claim 8, wherein said lead screw carries an enlarged head to limit movement of said screw in said longitudinal direction.

10. A brake according to claim 8, wherein said lead screw is adapted to act on said sensor through an axially extending transmission member or rod with which it is in operative engagement.

11. A brake according to claim 8, wherein said reset means comprises means for adjusting the effective length of said lead screw to determine a desired datum position for said sensor when assembling said brake assembly with new friction linings.

* * * * *